March 3, 1959  G. W. DUNHAM  2,875,858
BRAKE MECHANISM

Filed Aug. 14, 1956  2 Sheets-Sheet 1

INVENTOR.
GEORGE W. DUNHAM
BY George F. Des Marais
ATTORNEY

INVENTOR
GEORGE W. DUNHAM
BY
George F. Des Marais
ATTORNEY

United States Patent Office 2,875,858

Patented Mar. 3, 1959

2,875,858

BRAKE MECHANISM

George W. Dunham, Wilton, Conn.

Application August 14, 1956, Serial No. 603,893

5 Claims. (Cl. 188—77)

This invention relates to brake mechanism for applying a decelerating force to a rotating brake wheel. Among the objects of the invention is to provide a brake mechanism of the wrap-up type having a brake band which can be quickly activated to apply a braking effort to a rotating brake wheel and which is effective to stop the wheel from rotating within a fraction of a revolution of the wheel.

Another object of the invention is to provide in conjunction with a brake manually operable means by which a brake-applying mechanism may be reset to brake-released position and which is so arranged as automatically to move to a neutral position in which the manually operable means is unaffected upon release of the brake-applying mechanism to effect a braking action.

The principle of the invention will be better understood from the following description taken in connection with the accompanying drawing in which an embodiment of the invention has been set forth for purposes of illustration.

In the drawing, Fig. 1 is a side elevation of the brake mechanism with the brake band in a retracted or brake-released position;

Figure 1:
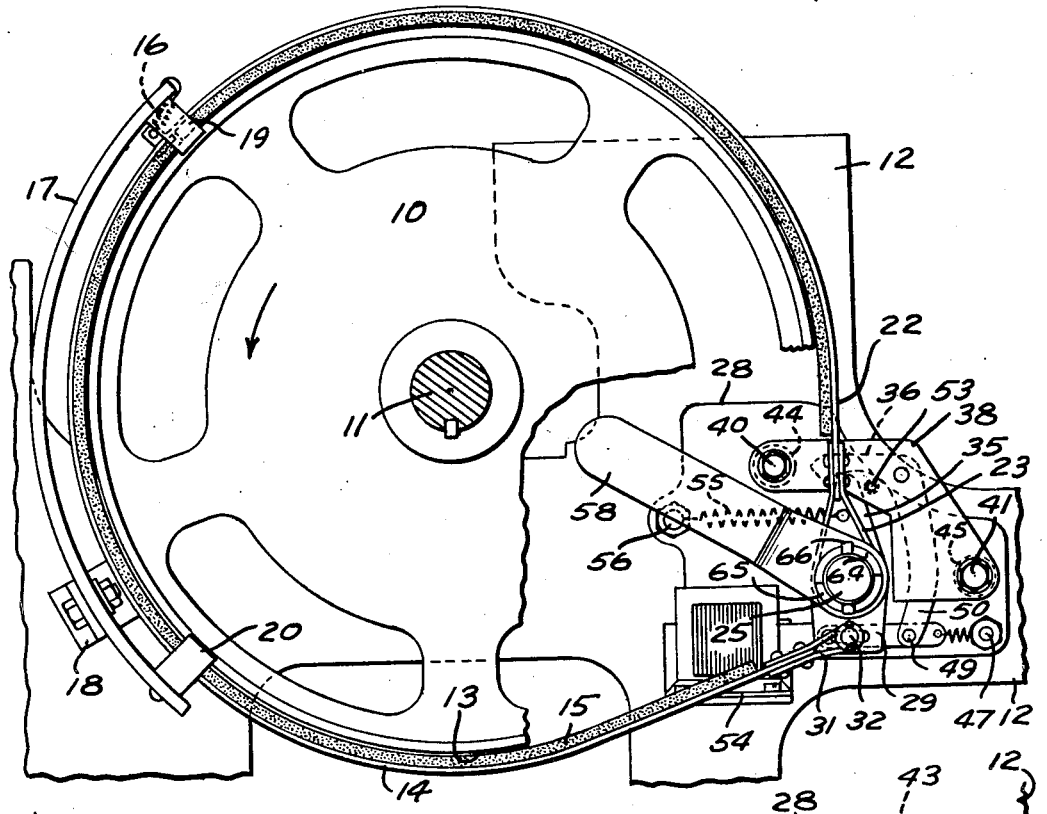

Referring to the drawing, a brake wheel 10 is fastened to a rotating shaft 11 which is journalled in side frame members of a machine, one of which is illustrated at 12. The brake wheel has a cylindrical braking surface 13 around which there is a flexible brake band 14 having a brake lining 15 normally held in a retracted position spaced from the braking surface of the wheel. The brake band is supported in retracted position by a spring 16 and by a brake-applying mechanism which will be described hereinbelow.

Figure 2:
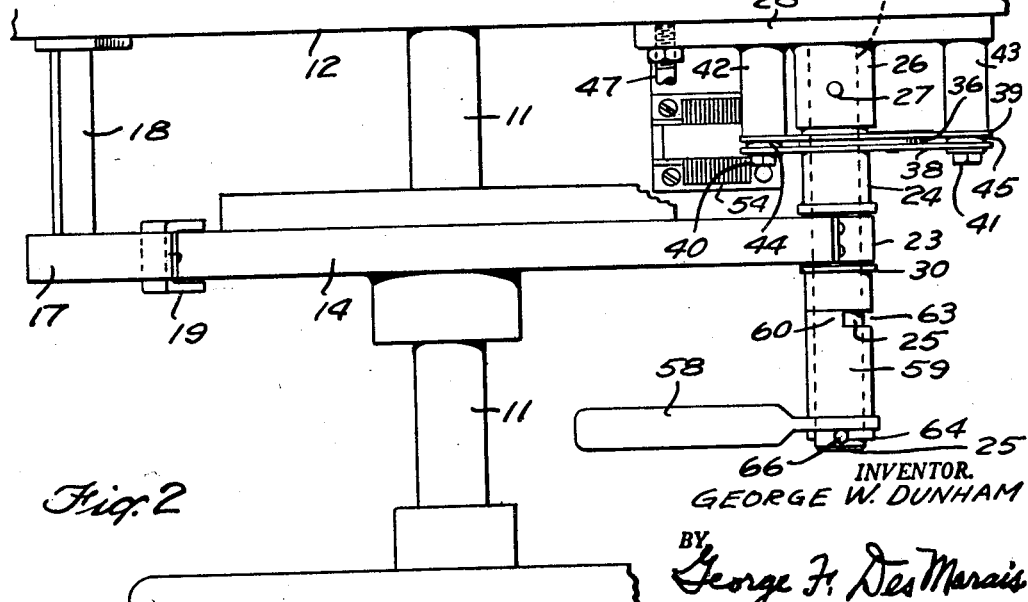
Fig. 2 is a view of the mechanism shown in Fig. 1 as seen from above.

The spring 16 is attached to a curvilinear member 17 which is bolted to the flange of a bracket 18, fastened to the frame 12, as shown in Figs. 1 and 2. The member 17 carries two U-shaped members 19 and 20, each having opposite legs which center the brake band with respect to the braking surface of the wheel.

As shown, the brake wheel rotates in a counterclockwise direction and one end of the brake band is anchored in a fixed position relative to the center of rotation of the brake wheel. The anchored end 22 is riveted to a loop 23 which loosely surrounds a sleeve 24 rotatably mounted on a stud shaft 25 extending from and fastened in a boss 26. The stud shaft is fixed against rotation by a pin 27 staked through the boss and the shaft. The boss 26 is integral with the base 28 of a casting which is bolted to the frame 12. The loop 23 is disposed between a brake arm 29 extending radially outwardly from the sleeve 24 and a snap ring 30, which together determine the transverse position of the loop with respect to the sleeve.

The sleeve 24, the brake arm 29 and a brake latch arm 35 constitute a movable member of the brake-applying mechanism mounted to turn about the stud shaft 25 in opposite directions as a unit. The lower or movable end of the brake band has riveted to it a loop 31 which is engaged by a pin 32 firmly secured to the brake arm 29. A washer and a cotter pin through the outer end of the pin 32 prevent the loop from slipping off from the end of the pin.

Figure 4:
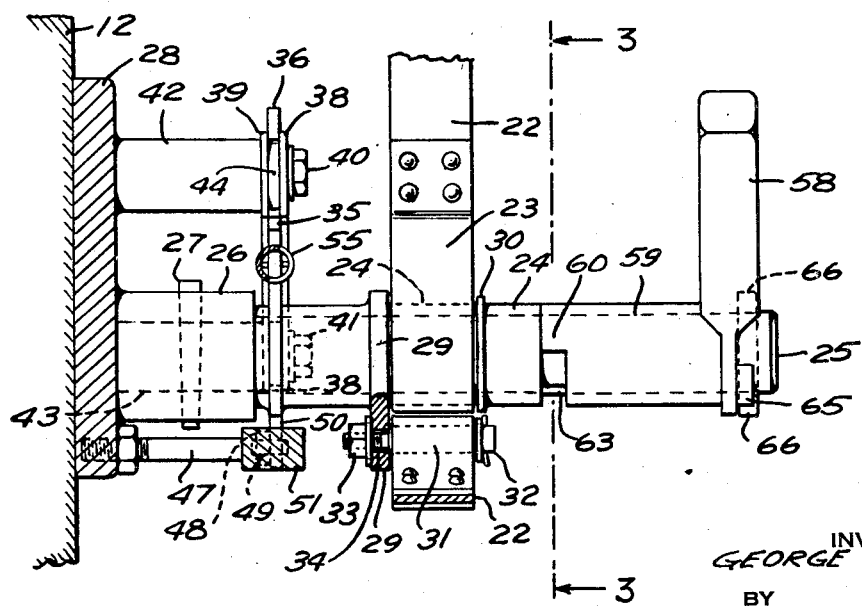
Fig. 4 is a vertical view on line 4—4 of Fig. 3.

As best seen in Fig. 4, the pin 32 has a shoulder which is held tightly against the outer side of the arm 29 by a nut 33. The nut is tightened against the inner side of the brake arm on the threaded stem of the pin which extends through an opening 34 in the brake arm. The opening is elongated to enable adjustment of the time that will elapse between the release of the brake-applying mechanism and the seizure of the brake band on the brake wheel. This is accomplished by attaching the pin 32 to the brake arm in a selected position along the opening.

The brake arm 29 and the sleeve 24 are held in brake-released position by latching means including a finger or brake latch arm 35, extending radially outwardly from the rotatable sleeve 24, and the pivoted latch member 36 mounted to turn on a pivot pin 37. The pivot pin 37 is supported by and extends between two plates 38 and 39, one at either side of the latch member 36. These plates are rigidly supported by bolts 40 and 41 fastened to posts 42 and 43, respectively, extending from the base 28. The plates 38 and 39 are spaced apart by washers 44 and 45 sufficiently to permit rotation of the latch member 36 on the pivot 37.

The latch member 36 is normally biased to engage the finger 35 by a spring 46 connecting between a fixed stud 47 and a link 48 which has a pivotal connection 49 with an arm 50 of the latch member 36. The link 48 is connected to an armature 51 of a solenoid 52 by which the latch member 36 is rocked clockwise to release the finger 35 whenever the solenoid is energized by a circuit condition requiring stopping of rotation of the brake wheel. The latch is supported by a pin 53 in the absence of the finger 35 when the solenoid is de-energized. The solenoid is bolted to a shelf 54 which extends from the base 28.

Figure 3:
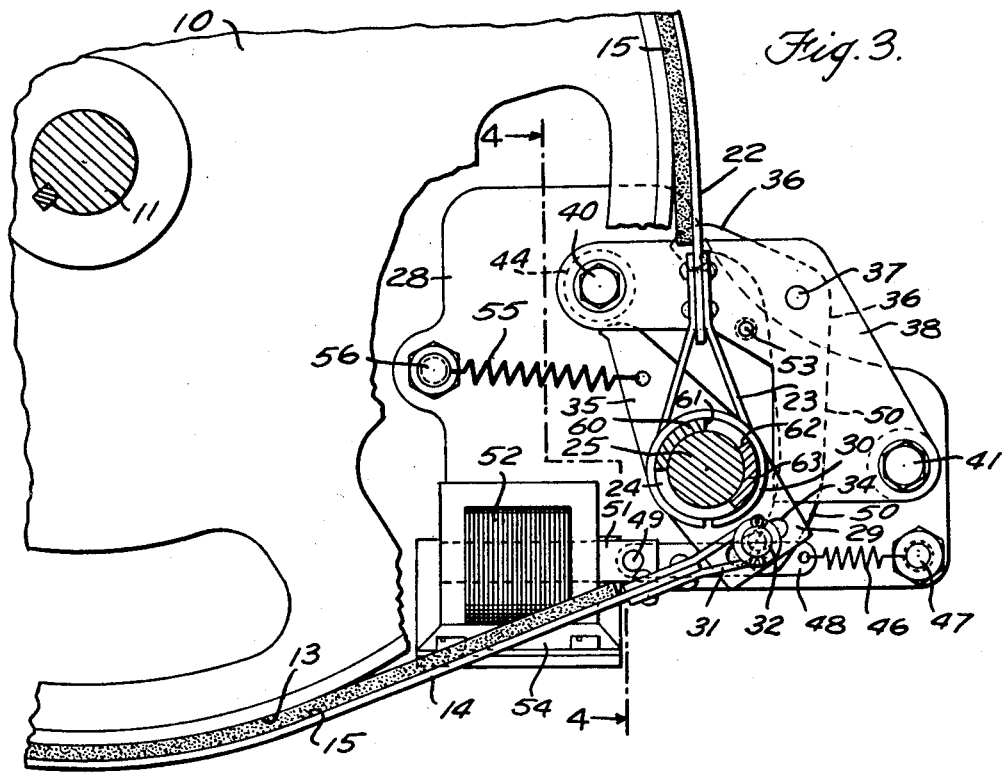
Fig. 3 is an enlarged detail of the braking mechanism with the parts shown in a brake-applying position and as viewed on line 3—3 of Fig. 4.

The movable brake-applying means including the rotatable sleeve 24 and brake arm 29 is rotated counterclockwise from the brake-released position, Fig. 1, to brake-applying position, Fig. 3, by a spring 55 having one end secured to the finger 35 and its other end attached to a stud 56 which is screwed into the base 28. The connected brake arm 29 and finger 35 functions as a lever rotatably mounted on a fulcrum provided by the stud shaft 25.

As shown in Fig. 3, the spring 55 has rocked the brake lever (29, 24, 35) to brake-applying position, and the brake band is tightened against the peripheral surface of the brake wheel. A device is provided for rotating the brake lever clockwise to restore the brake band to a normal position out of engagement with the brake wheel. This device includes a reset member 58 in the form of a handle. The reset member is fastened to a sleeve 59 which is rotatably mounted on the stud shaft 25. A lost motion connection is provided between the member 58 and the brake lever arm 29 whereby the member 58 can be actuated in one direction to reset the brake lever and the brake band to normal position and then moved in another direction to locate the member in a neutral position in which it will remain unaffected when the brake lever is subsequently released from its normal position. In the embodiment of the invention illustrated, the lost motion connection is between the sleeve 59 and the sleeve 24.

The sleeve 59 has a tongue 60 with a clutch abutment surface 61 which is adapted to engage a clutch abutment surface 62 of a tongue 63 on the sleeve 24 whenever the sleeve 59 is rotated clockwise (Fig. 3), to reset the brake lever. The tongues 60 and 63 overlap each other axially and serve as a pick-up connection between the sleeves. Owing to the action of gravity the reset member 58 and the sleeve 59 are normally disposed in neutral position, Figs. 1, 2 and 4.

As shown in Fig. 3, the tongue 60 of the sleeve 59 is disposed at the limit of its counterclockwise rotation with the member 58 in neutral postion, and rotation of the sleeve clockwise from this position will advance the abutment surface 61 into engagement with the abutment surface 62 and rotate the sleeve 24 upon further clockwise movement of the sleeve 59. This action releases the brake and resets the brake lever as the latch member 36 hooks over the end of the finger 35, Fig. 1.

When the finger 35 is released from the latch 36 the sleeve 24 rotates counterclockwise until restrained by the tightening of the brake band on the wheel before the abutment surface 62 can reach the abutment surface 61 on the sleeve 59. With the sleeve 59 and the member 58 in neutral position the abutment surface 61 is out of range for engagement by the abutment surface 62, and the member 58 is not disturbed when the brake lever is released and rotates to tighten the brake band.

The handle member 58 is supported in neutral position by the engagement of lugs 64 and 65 on the sleeve 59 with a pin 66 carried by the stud shaft 25. The lugs 64 and 65 are so disposed on the sleeve 59 and with respect to the pin 66 that the handle member 58 will return to neutral position (Figs. 1, 2 and 3) under the force of gravity where it always remains except when manually operated to reset the brake band in retracted position.

The pin 66 is removable from the shaft 25 and upon its removal the sleeve 59 and attached handle member may be removed from the shaft to enable replacement of the brake band after removal of the snap ring 30.

The brake mechanism is capable of applying a braking torque on the brake wheel immediately upon energization of the solenoid, and the various parts are so constructed and arranged as to be easily adjusted for stopping the rotation of the brake wheel within a small angle of rotation. It is particularly suitable for use on high speed looms which require immediate response for stoppage of the crankshaft when warp or weft yarns break, and the stopping of the operation of the loom when the lay is in a position most advantageous to the weaver.

While the form of mechanism herein show and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. Brake mechanism for applying a decelerating force to a rotatable brake wheel having a braking surface, said mechanism comprising a fixed shaft, a brake lever including a sleeve rotatably mounted on said shaft, a flexible brake band partially surrounding said wheel and having separated ends with one end anchored in fixed position and the other of said ends attached to said brake lever, a spring attached to said brake lever to tighten said brake band onto said brake wheel, latching means for holding said brake lever in a brake-released position against the force of said spring, means for tripping said latching means, means rockable about the axis of said shaft to restore said brake lever to brake-released position against the action of said spring after a braking action, said last-named means comprising a clutch abutment for engaging an abutment carried by said brake lever sleeve when rocked in one direction, said last-named means being movable in the opposite direction to a neutral position at which its clutch abutment is disposed out of range for engagement by the abutment carried by said brake lever sleeve when said lever rotates in said opposite direction to tighten said brake band.

2. Brake mechanism for applying a decelerating force to a rotatable brake wheel having a braking surface, said mechanism comprising a fixed shaft, a sleeve rotatably mounted on said shaft, a brake lever extending radially outwardly from said rotatable sleeve, a flexible brake band partially surrounding said wheel and normally spaced from said wheel, said brake band having separated ends with one of said ends having a loop surrounding said rotatable sleeve and the other of said ends attached to said brake lever, spring means for rotating said rotatable sleeve and brake lever to tighten said brake band onto said brake wheel, latching means for holding said rotatable sleeve and brake lever in a brake-released position against the force of said spring means, means for tripping said latching means, means rockable about the axis of said shaft to restore said rotatable sleeve and brake lever brake-released position against the action of said spring means after a braking action, said rockable means comprising a lever arm and a clutch abutment for engaging an abutment carried by said rotatable sleeve, said rockable means being movable to a neutral position at which its clutch abutment is disposed out of range for engagement by the abutment carried by said rotatable sleeve when said sleeve and brake lever are released to tighten said brake band, and means to support said rockable means in neutral position, whereby said lever arm is unaffected when said latching means is tripped and said brake lever acts to apply the stored energy of said spring means to said brake band.

3. Brake mechanism for applying a decelerating force to a rotatable brake wheel having a braking surface, said mechanism comprising a flexible brake band partially encircling said wheel and normally retracted from the braking surface of said wheel, support means for restraining said brake band against movement in the direction of rotation of said wheel while permitting movement of said brake band from retracted position to brake-applying position, said support means including means anchoring one end of said brake band in a fixed position relative to the axis of said brake wheel and movable means attached to the other end of said brake band and movable between a brake-released position and a brake-applying position, a shaft rotatably mounting said movable means, a spring connected to said movable means and acting to rotate said movable means from brake-released position to brake-applying position, latching means for holding said movable means in brake-released position, a member operable to rotate said movable means from brake-applying position to brake-released position against the action of said spring, said member and said movable means having engageable tongues, respectively, so disposed as to permit their separation and the return of said member to a neutral position when said movable means have been engaged by said latching means, and means for tripping said latching means to permit movement of said movable means by said spring and movement of said brake band from retracted position to brake-applying position without disturbing said member in neutral position.

4. Brake mechanism for applying a decelerating force to a rotatable brake wheel having a braking surface, said mechanism comprising a fixed shaft, a sleeve rotatably mounted on said shaft, a brake lever extending radially outwardly from said rotatable sleeve, a flexible brake band partially surrounding said wheel and normally spaced from said wheel, said brake band having separated ends with one end anchored in fixed position, a pin engaging the other of said ends of said band, said pin fixedly engaged in a slot in said brake lever, a spring for rotating said rotatable sleeve and brake lever to tighten said brake band onto said brake wheel, latching means for holding said rotatable sleeve and brake lever in a brake-released position against the force of said spring, said latching means comprising a brake latch arm attached to said sleeve and a pivoted latch member, means for tripping said latching means, means to restore said rotatable sleeve and brake lever to brake-released position against the action of said spring after a braking action, said means comprising a handle member and a lost motion connection between said handle member and said rotatale sleeve, and means for supporting said handle member in a neutral position out of range for engagement by said sleeve when said sleeve and brake lever are released to tighten said brake band.

5. In a brake mechanism for quickly stopping a rotating loom shaft, the combination comprising a brake wheel fixed to a rotating shaft and having an exterior braking surface, a flexible brake band surrounding the greater portion of said brake surface circumferentially and having separated leading and trailing ends, means for supporting said brake band in a normal position retracted from the braking surface of said wheel, said supporting means including anchoring means attached to the trailing end of said brake band to hold the trailing end immovable during a braking action of said brake band, a lever connected to the leading end of said brake band, said lever being pivotable on a fixed stud shaft close by the leading end of said brake band and normally positioned to maintain said brake band from braking engagement with said brake wheel, latching means for engaging and holding said lever in said normal position, a brake-energizing spring having one end anchored and normally tensioned between its anchored end and said lever for pivoting said lever upon the release of said lever and from engagement by said latching means, means for actuating said latching means to disengage and release said lever from its normal position whereby upon the release of said lever said lever is pivoted by said spring and the energy stored in said spring is applied to move the leading end of said brake band to tighten the brake band around the brake wheel, and means to slacken said brake band and restore it to normal position out of engagement with said brake wheel, said last-named means including a movable member and a lost motion connection between said member and said lever, said lost motion connection enabling said member to be automatically returned to a position of rest in which it is unaffected by the movement of said lever by said spring when said lever is released from restraint by said latching means and said brake band is tensioned to engage and stop said wheel.

References Cited in the file of this patent

UNITED STATES PATENTS

| | | |
|---|---|---|
| 1,375,415 | Pearson | Apr. 19, 1921 |
| 1,804,773 | Hubbell | May 12, 1931 |
| 1,893,427 | McDonald | Jan. 3, 1933 |
| 1,921,593 | Taylor | Aug. 8, 1933 |
| 2,273,328 | Miller | Feb. 17, 1942 |
| 2,295,224 | LeTourneau | Sept. 8, 1942 |